(12) United States Patent
Dai et al.

(10) Patent No.: US 10,903,989 B2
(45) Date of Patent: Jan. 26, 2021

(54) BLOCKCHAIN TRANSACTION PROCESSING METHOD AND APPARATUS

(71) Applicant: Advanced New Technologies Co., Ltd., Grand Cayman (KY)

(72) Inventors: Ping Dai, Hangzhou (CN); Wenlong Yang, Hangzhou (CN); Shubo Li, Hangzhou (CN); Jincheng Wang, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/813,634

(22) Filed: Mar. 9, 2020

(65) Prior Publication Data

US 2020/0213103 A1 Jul. 2, 2020

Related U.S. Application Data

(63) Continuation of application No. PCT/CN2020/071415, filed on Jan. 10, 2020.

(30) Foreign Application Priority Data

Aug. 30, 2019 (CN) .......................... 2019 1 0816134

(51) Int. Cl.
*H04L 9/08* (2006.01)
*H04L 9/06* (2006.01)
*G06Q 20/40* (2012.01)

(52) U.S. Cl.
CPC ......... *H04L 9/0825* (2013.01); *G06Q 20/405* (2013.01); *H04L 9/0643* (2013.01); *G06Q 2220/00* (2013.01); *H04L 2209/38* (2013.01)

(58) Field of Classification Search
CPC . H04L 9/0825; H04L 9/0643; H04L 2209/38; G06Q 20/405; G06Q 2220/00
See application file for complete search history.

(56) References Cited

U.S. PATENT DOCUMENTS

2018/0089256 A1* 3/2018 Wright, Sr. ........ G06Q 20/1235
2019/0172159 A1* 6/2019 Sun .................... G06Q 30/018
(Continued)

FOREIGN PATENT DOCUMENTS

CN 108513669 9/2018
CN 108665372 10/2018
(Continued)

OTHER PUBLICATIONS

Etherscan.io [Online], "Transaction Details; Transaction Hash: 0x749bd7cf0d70d50195a9f7a5e4a285bf34f391d632f3d36957e5451d3570ed07," Timestamp: Aug. 6, 2019, [Retrieved on Apr. 15, 2020], retrieved from: URL<https://etherscan.io/tx/0x749bd7cf0d70d50195a9f7a5e4a285bf34f391d632f3d36957e5451d3570ed07>, 1 page.

(Continued)

*Primary Examiner* — Hee K Song
(74) *Attorney, Agent, or Firm* — Fish & Richardson P.C.

(57) ABSTRACT

Disclosed herein are methods, systems, and apparatus, including computer programs encoded on computer storage media, for processing blockchain transactions. One of the methods includes: obtaining, by a blockchain node of a consortium blockchain network, a blockchain transaction associated with a service; invoking a smart contract corresponding to the service; determining presentation information based on the smart contract and the service, wherein the presentation information is presented to a user through a client device in response to receiving a query from the client device; recording the presentation information into a blockchain transaction log based on the smart contract; and recording the blockchain transaction and the blockchain transaction log of the blockchain transaction into a blockchain.

23 Claims, 8 Drawing Sheets

(56) References Cited

U.S. PATENT DOCUMENTS

| | | | |
|---|---|---|---|
| 2019/0253245 A1* | 8/2019 | Zhang | H04L 9/14 |
| 2019/0266145 A1 | 8/2019 | Qiu et al. | |
| 2019/0281066 A1* | 9/2019 | Simons | H04L 9/3226 |
| 2020/0014528 A1* | 1/2020 | Nandakumar | H04L 9/0637 |
| 2020/0074117 A1* | 3/2020 | Camenisch | G06F 16/1805 |
| 2020/0074458 A1* | 3/2020 | Govindarajan | H04L 9/3247 |
| 2020/0092364 A1* | 3/2020 | Schultz | G06F 21/64 |
| 2020/0110813 A1* | 4/2020 | Kamijoh | G06F 16/23 |
| 2020/0117823 A1* | 4/2020 | Ojha | G06Q 20/3827 |
| 2020/0117825 A1* | 4/2020 | Vaswani | G06F 21/64 |
| 2020/0118131 A1* | 4/2020 | Diriye | G06Q 20/4016 |
| 2020/0119910 A1* | 4/2020 | Ojha | G06F 16/2465 |
| 2020/0119922 A1* | 4/2020 | Bingham | G06F 21/36 |
| 2020/0119925 A1* | 4/2020 | Wang | G06Q 20/3827 |

FOREIGN PATENT DOCUMENTS

| | | |
|---|---|---|
| CN | 108805507 | 11/2018 |
| CN | 108846603 | 11/2018 |
| CN | 109213790 | 1/2019 |
| CN | 109753530 | 5/2019 |
| CN | 109816021 | 5/2019 |
| CN | 110046193 | 7/2019 |
| CN | 110163751 | 8/2019 |
| CN | 110597877 | 12/2019 |

OTHER PUBLICATIONS

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

PCT International Search Report and Written Opinion in International Application No. PCT/CN2020/071415, dated May 27, 2020, 21 pages (with machine translation).

U.S. Appl. No. 16/813,516, Yang, filed Mar. 9, 2020.

U.S. Appl. No. 16/813,516, filed Mar. 9, 2020, Yang.

* cited by examiner

BLOCKCHAIN TRANSACTION PROCESSING METHOD AND APPARATUS

CROSS-REFERENCE TO RELATED APPLICATIONS

This application is a continuation of PCT Application No. PCT/CN2020/071415, filed on Jan. 10, 2020, which claims priority to Chinese Patent Application No. 201910816134.3, filed on Aug. 30, 2019, and each application is hereby incorporated by reference in its entirety.

TECHNICAL FIELD

Implementations of the present specification relate to the field of information technologies, and in particular, to blockchain transaction processing methods and apparatuses.

BACKGROUND

Currently, it is a trend to combine a blockchain technology with a service. A user can query a blockchain transaction stored in a blockchain network to obtain service information carried in the blockchain transaction, to understand the service status.

However, in practice, some forms of service information carried in a blockchain transaction are not suitable to be presented to a user. For example, the service information in the blockchain transaction can be service code, which is relatively abstract to the user and difficult to understand. For another example, the service information in the blockchain transaction can be summarized information, which is not clear to the user. For another example, the service information in the blockchain transaction is only presented in a text, but the user expects to present the service information to be presented in a more vivid manner (such as shown with an audio and/or video).

In view of this, a blockchain transaction processing method is needed to optimize a presentation form of service information carried in a blockchain transaction, so that the service information can be shown to the user in a friendly way.

SUMMARY

To optimize a form of presenting service information carried in a blockchain transaction, implementations of the present specification provides blockchain transaction processing methods and apparatuses. Technical solutions are as follows:

According to a first aspect of the implementations of the present specification, a blockchain transaction processing method is provided.

Each node in a blockchain network performs the following operations: obtaining a blockchain transaction generated by a specified service, where the blockchain transaction carries service information; invoking a pre-deployed smart contract corresponding to the specified service; determining presentation information based on the smart contract and the service information; writing the determined presentation information into a transaction log of the blockchain transaction based on the smart contract; and writing the blockchain transaction and the transaction log of the blockchain transaction into a blockchain, where when a user requests to query the blockchain transaction, the presentation information in the transaction log is presented to the user.

According to a second aspect of the implementations of the present specification, a blockchain transaction processing apparatus is provided. The apparatus is any node in a blockchain network. The apparatus includes the following: an obtaining module, configured to obtain a blockchain transaction generated by a specified service, where the blockchain transaction carries service information; an invoking module, configured to invoke a pre-deployed smart contract corresponding to the specified service; a determining module, configured to determine presentation information based on the smart contract and the service information; a processing module, configured to write the determined presentation information into a transaction log of the blockchain transaction based on the smart contract; and an on-chain module, configured to write the blockchain transaction and the transaction log of the blockchain transaction into a blockchain, where when a user requests to query the blockchain transaction, the presentation information in the transaction log is presented to the user.

In the technical solutions provided in the implementations of the present specification, the smart contract corresponding to the specified service is deployed in the blockchain network to determine, based on the service information carried in the blockchain transaction generated by the specified service, the presentation information suitable to be presented to the user. The determined presentation information is written into the transaction log of the blockchain transaction as an execution result of the blockchain transaction. Because both the blockchain transaction and the corresponding transaction log are written into a blockchain, the presentation information in the transaction log of the blockchain transaction can be presented to the user when the user subsequently requests to query the blockchain transaction.

It should be understood that the previous general description and the following detailed description are merely example and illustrative, and cannot limit the implementations of the present specification.

In addition, any one of the implementations of the present specification does not need to implement all the previous effects.

BRIEF DESCRIPTION OF DRAWINGS

To describe the technical solutions in the implementations of the present specification or in the existing technology more clearly, the following briefly describes the accompanying drawings required for describing the implementations or the existing technology. Clearly, the accompanying drawings in the following description merely show some implementations of the present specification, and a person of ordinary skill in the art can still derive other drawings from these accompanying drawings.

DESCRIPTION OF IMPLEMENTATIONS

To make a person skilled in the art understand the technical solutions in the implementations of the present specification better, the following clearly and comprehensively describes the technical solutions in the implementations of the present specification with reference to the accompanying drawings in the implementations of the present specification. Clearly, the described implementations are merely some but not all of the implementations of the present specification. All other implementations obtained by a person of ordinary skill in the art based on the implementations of the present specification shall fall within the protection scope of the present specification.

The technical solutions provided in the implementations of the present specification are described in detail below with reference to the accompanying drawings.

Figure 1:
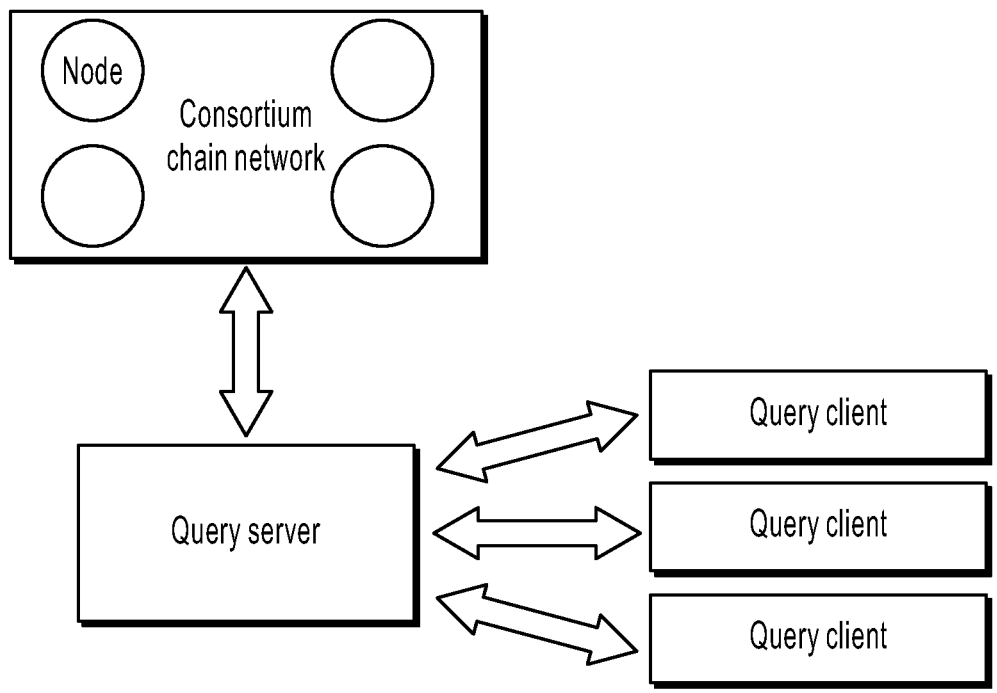
FIG. 1 is a schematic architectural diagram illustrating a blockchain transaction query system, according to an implementation of the present specification.

FIG. 1 is a schematic architectural diagram illustrating a blockchain transaction query system, according to an implementation of the present specification. As shown in FIG. 1, the system includes a consortium chain network, a query server, and at least one query client.

The consortium chain network is a consortium blockchain network formed by node devices respectively controlled by a plurality of organization members. In practice, a blockchain transaction generated by a service can be submitted to the consortium chain network for storage.

The query server is a centralized device introduced in the implementations of the present specification and interconnected with the consortium chain network. The query server has permission to access a blockchain on at least one node in the consortium chain network. Certainly, the consortium chain network can also grant no permission to the query server to access the blockchain.

In practice, the query server is a server of a blockchain as a service (BaaS) platform. The consortium chain network can be initiated and established by using the BaaS platform. The administrator of the consortium chain network can log in to the BaaS platform to configure parameters of the consortium chain network (for example, a quantity of nodes, a consensus protocol, whether to authorize a user to access, and which user is authorized with access permission).

A typical client-server (C/S) architecture is between the query client and the query server. The query server can correspond to more than one query client, and each query client corresponds to one user. When the user wants to query the blockchain transaction stored in the consortium chain network, the user needs to use the query client installed on a device (for example, a mobile phone or a computer) of the user to request the query server to conduct the query.

The query server creates in advance a query service interface corresponding to each blockchain transaction stored in the consortium chain network, and exposes the created query service interface to each query client. The query service interface is actually an application programming interface (API). The query server exposes the API corresponding to each blockchain transaction to the query client, which means that the query client can invoke an API to initiate a query request for the blockchain transaction corresponding to the API.

Any query client determines, as a target query service interface, a query service interface specified by a user; invokes the target query service interface of the query server; and provides a blockchain transaction received from the query server for the user.

When detecting that the target query service interface is invoked, the query server obtains a blockchain transaction corresponding to the target query service interface from the consortium chain network, and returns the obtained blockchain transaction to the query client.

It can be seen from the following implementations that the query server can also return presentation information in a transaction log corresponding to the target query service interface to the query client for presentation, and can further query each related blockchain transaction before the blockchain transaction corresponding to the target query service interface and presentation information in a corresponding transaction log based on a transaction identifier of a previous related blockchain transaction in the transaction log of the blockchain transaction corresponding to the target query service interface, and return the further queried information to the query client.

Figure 2:
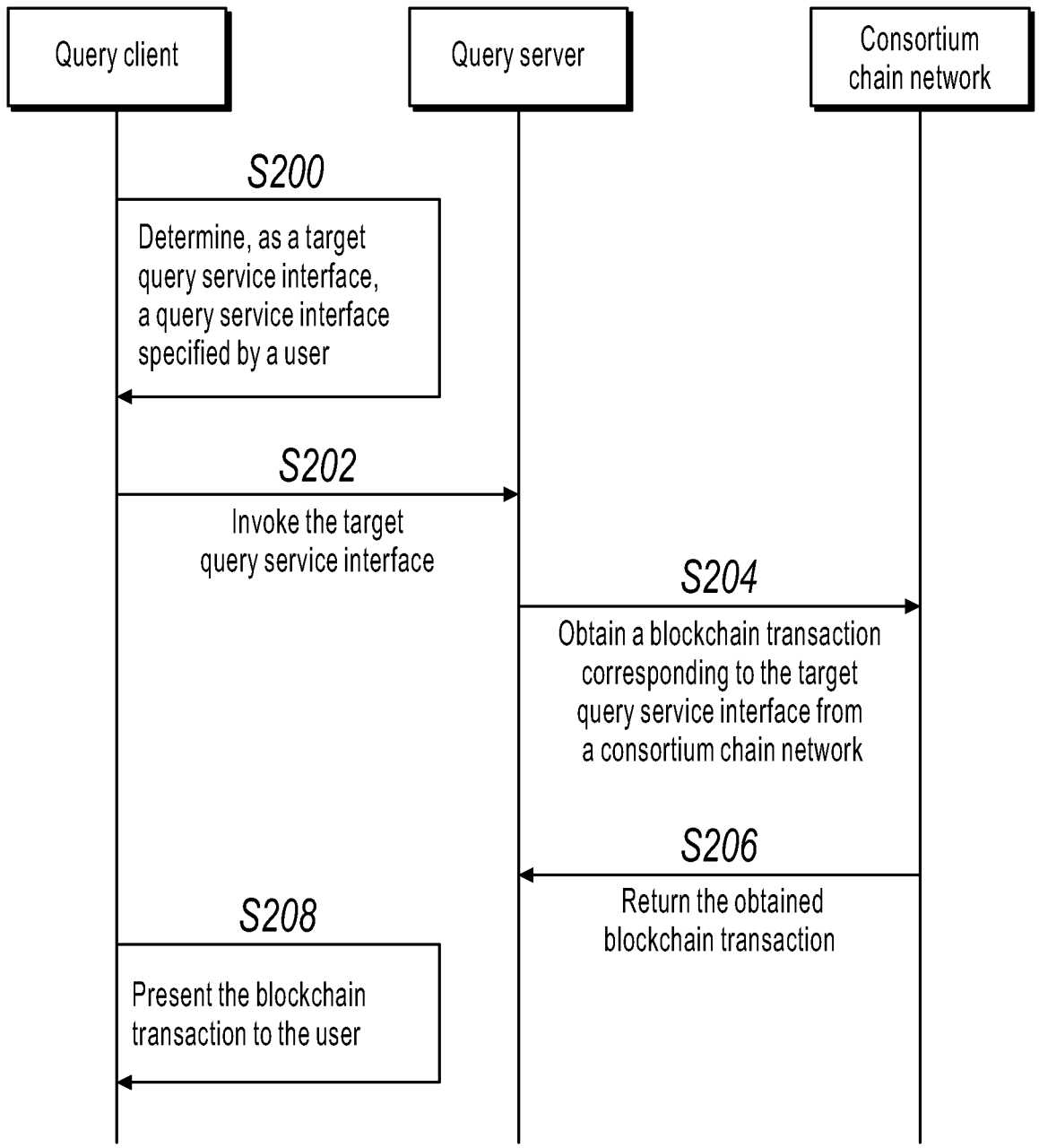
FIG. 2 is a schematic flowchart illustrating a blockchain transaction query method, according to an implementation of the present specification.

FIG. 2 is a schematic flowchart illustrating a blockchain transaction query method, according to an implementation of the present specification. The method includes the following steps:

S200. A query client determines, as a target query service interface, a query service interface specified by a user.

In the implementation of the present specification, when the user needs to query a blockchain transaction, the user can input a transaction identifier of the blockchain transaction (generally, a hash value of the blockchain transaction) to the query client, and the query client determines, based on the transaction identifier input by the user, a blockchain transaction to be queried by the user and further determines a query service interface to be invoked.

Further, the query server can determine a corresponding uniform resource locator (URL) for each query service interface, and deliver the URL to the query client. The query client presents the URL corresponding to each query service interface to the user. The user triggers the URL to specify the query service interface to be invoked.

Further, the query server can encode the URL corresponding to each query service interface to obtain a barcode (one-dimensional barcode, two-dimensional barcode, etc.), and deliver the barcode to the query client. A user can present a barcode of a query service entry corresponding to a blockchain transaction to another user through a query client of the user. Another user can scan the barcode by using a query client of the another user and trigger the query client to invoke a corresponding query service entry.

That is, the query client scans a barcode specified by the user, parses out an interface identifier included in the barcode, and further uses, as the target query service interface, the query service interface corresponding to the interface identifier obtained through parsing.

In the implementation of the present specification, the query client can determine whether the user has blockchain transaction query permission, and in response to determining that the user has blockchain transaction query permission, determine the query service interface specified by the user.

Alternatively, the query client determines whether the user has blockchain transaction query permission, and in response to determining that the user has blockchain transaction query permission, invokes the target query service interface of the query server.

In the implementation of the present specification, the administrator of the consortium chain network (generally specified by an organization member of initiating the consortium chain network) can configure query permission on the BaaS platform (namely, the query server). The administrator can specify identities of some users (for example, a mobile number, an identity card number, and an account number) to the query server. The users with these identities are authorized to query a blockchain transaction in the consortium chain network. The query server records these identities having the query permission.

The query client determines whether the user has blockchain transaction query permission. The query client can send the identity information of the user to the query server. The query server determines, based on the received identity information, whether the user corresponding to the identity information is in users having the blockchain transaction query permission that are specified in advance by the specifying organization member; and if yes, notifies the query client that the user corresponding to the identity information has the blockchain transaction query permission; otherwise, notifies the query client that the user corresponding to the identity information does not have the blockchain transaction query permission.

S202. The query client invokes the target query service interface of the query server.

S204. When detecting that the target query service interface is invoked, the query server obtains a blockchain transaction corresponding to the target query service interface from the consortium chain network.

S206. Return the obtained blockchain transaction to the query client.

In the implementation of the present specification, a specifying organization member of the consortium chain network grants a permission certificate of the specifying organization member to the query server in advance, and the permission certificate is used to access a blockchain on a node controlled by the specifying organization member.

When detecting that the target query service interface is invoked, the query server can access the blockchain on the node controlled by the specifying organization member by using the permission certificate granted by the specifying organization member in advance; and read the blockchain transaction corresponding to the target query service interface from the accessed blockchain.

In the implementation of the present specification, the query server can determine whether content of the obtained blockchain transaction violates a predetermined content review rule; and if the content of the obtained blockchain transaction does not violate the predetermined content review rule, return the obtained blockchain transaction to the query client. For example, the query server can detect transaction content in the obtained blockchain transaction based on the keyword detection technology. If the transaction content involves pornography, it is determined that the transaction does not comply with the content review rule. In this case, the blockchain transaction is prevented from being returned to the query client.

S208. The query client queries the received blockchain transaction for the user.

In the implementation of the present specification, for each query service interface, the query server can record each invoking event of the query service interface. Information about the event includes a time, a location, identity information of a requested user, etc. Alternatively, an event that each user queries a blockchain transaction can be recorded.

In the method shown in FIG. 2, the centralized "query server—query client" architecture is introduced. A query server is interconnected with a consortium chain network. A query service interface is correspondingly created for each blockchain transaction stored in the consortium chain network. The query service interface corresponding to each blockchain transaction is exposed to a query client. The user queries a blockchain transaction through the query client by invoking the query service interface, which is easy and efficient.

In addition, the present specification further discloses a blockchain transaction processing method. The method is used to optimize a presentation form of service information carried in a blockchain transaction, so that the service information is presented to the user in a friendlier manner. It is worthwhile to note that the blockchain transaction processing method disclosed in the present specification is not limited to optimizing the presentation form of the service information of the blockchain transaction stored in the consortium chain network, and can further optimize a presentation form of service information in a blockchain transaction stored in another type of blockchain network (for example, a public chain network).

Figure 3:
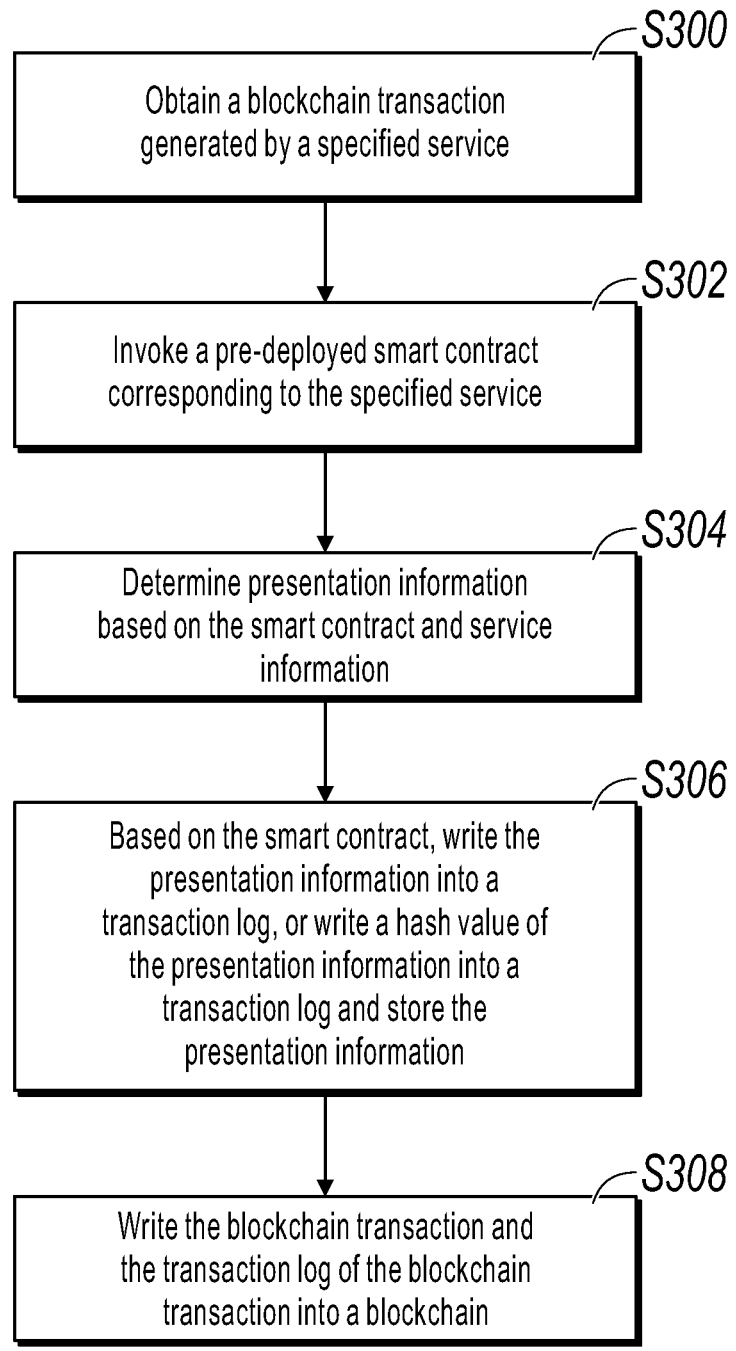
FIG. 3 is a schematic flowchart illustrating a blockchain transaction processing method, according to an implementation of the present specification.

FIG. 3 is a schematic flowchart illustrating a blockchain transaction processing method, according to an implementation of the present specification. Each node in a blockchain network executes the following steps:

S300. Obtain a blockchain transaction generated by a specified service.

In the present specification, the blockchain transaction generated by the service means a blockchain transaction initiated by a user participating in a service when the service is performed. The blockchain transaction includes service information.

In the implementation of the present specification, a blockchain network can interconnect with a plurality of services at the same time. For example, the blockchain network can interconnect with a data storage service and a product tracing service. A blockchain transaction is correspondingly generated each time a piece of data needs to be stored in the data storage service. Service information carried in the blockchain transaction can be a hash value of data to be stored. A blockchain transaction is correspondingly generated each time a flow of product needs to be recorded in the product tracing service. Service information carried in the blockchain transaction can be record information related to the product in the flow.

The specified service can be one of a plurality of services interconnected with a blockchain network. For ease of description, the method in FIG. 3 is for the specified service.

S302. Invoke a pre-deployed smart contract corresponding to the specified service.

In the implementation of the present specification, to alleviate a problem that service information in a blockchain transaction is not suitable to be presented to a user, a smart contract corresponding to a specified service is deployed in a blockchain network. The smart contract is used to implement a function of determining, based on the service information in the blockchain transaction, presentation information suitable to be presented to the user. It can be understood that if a plurality of services are interconnected with the blockchain network, a smart contract corresponding to each service needs to be deployed in the blockchain network.

After obtaining the blockchain transaction generated by the specified service, each node in the blockchain network needs to invoke the smart contract corresponding to the specified service to process the blockchain transaction.

S304. Determine presentation information based on the smart contract and the service information.

S306. Write the determined presentation information into a transaction log of the blockchain transaction based on the smart contract; or write a hash value of the determined presentation information into a transaction log of the blockchain transaction, and store the determined presentation information.

Steps S304 to S306 provide a process of processing a blockchain transaction by using a smart contract.

Determining the presentation information based on the service information can be converting the service information into presentation information used to be presented to the user. For example, the service information is a segment of abstract code. In this case, the code is converted into text language for the user to understand.

Determining the presentation information based on the service information can alternatively be selecting presentation information matching the service information from predetermined presentation information.

Certainly, in practice, there can be a plurality of methods for determining the presentation information based on the service information, which is not limited in the present specification.

In the implementation of the present specification, the determined presentation information can be encrypted by using an encryption key provided by an initiator of the blockchain transaction, and the encrypted presentation information is written into a transaction log of the blockchain transaction. If the asymmetric encryption technology is used, the encryption key can be a public key of the initiator of the blockchain transaction. In this case, only the initiator of the blockchain transaction can perform decryption by using the private key of the initiator.

In the implementation of the present specification, the determined presentation information can be encrypted by using the encryption key provided by the initiator of the blockchain transaction, and the encrypted presentation information is stored.

In the implementation of the present specification, the smart contract corresponding to the specified service can further include a data structure agreed upon in advance with the query client. In this case, by using the smart contract, presentation information encapsulated based on the data structure can be determined based on the service information and the data structure in the smart contract.

S308. Write the blockchain transaction and the transaction log of the blockchain transaction into a blockchain.

When a user requests to query the blockchain transaction, the presentation information in the transaction log is presented to the user.

In the method shown in FIG. 3, the smart contract corresponding to the specified service is deployed in the blockchain network to determine, based on the service information carried in the blockchain transaction generated by the specified service, the presentation information suitable to be presented to the user. The determined presentation information is written into the transaction log of the blockchain transaction as an execution result of the blockchain transaction. Because both the blockchain transaction and the corresponding transaction log are written into a blockchain, the presentation information in the transaction log of the blockchain transaction can be presented to the user when the user subsequently requests to query the blockchain transaction.

Figure 4:
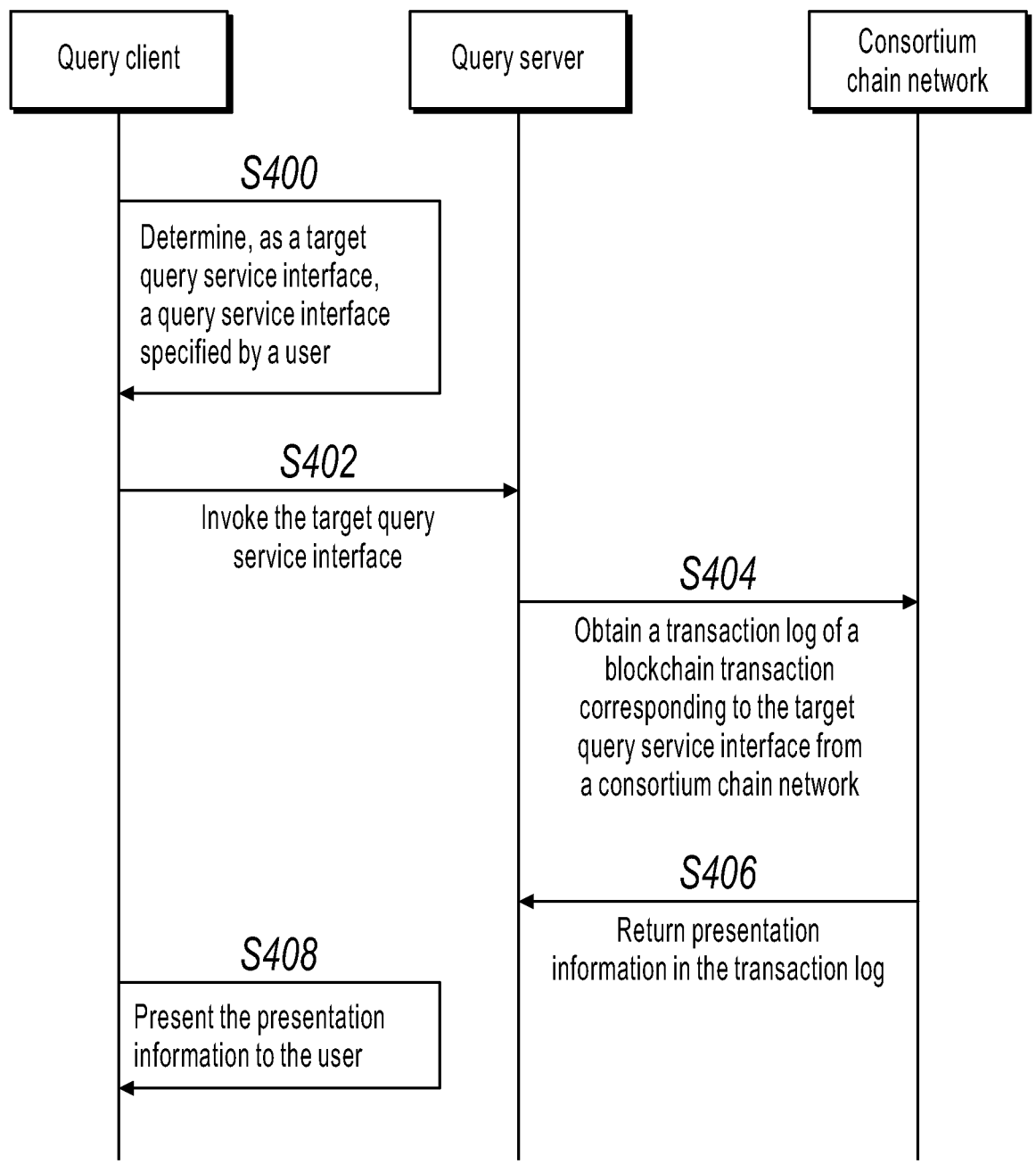
FIG. 4 is a schematic flowchart illustrating a blockchain transaction processing method, according to an implementation of the present specification.

FIG. 4 is a schematic flowchart illustrating a presentation information query method shown in FIG. 3, according to an implementation of the present specification. The method includes the following steps:

S400. A query client determines, as a target query service interface, a query service interface specified by a user.

S402. The query client invokes the target query service interface of the query server.

S404. When detecting that the target query service interface is invoked, the query server obtains a transaction log of a blockchain transaction corresponding to the target query service interface from the consortium chain network.

S406. The query server extracts presentation information from the transaction log, and returns the presentation information to the query client.

Certainly, if only a hash value of the presentation information exists in the transaction log, the transaction log may not be obtained. Instead, the presentation information corresponding to the blockchain transaction corresponding to the target query service interface is obtained from storage of any node instead of blockchain in the consortium chain network.

S408. The query client presents the received presentation information to the user.

The method shown in FIG. 4 is actually based on the architecture shown in FIG. 1. When the user requests to query a blockchain transaction, presentation information corresponding to service information carried in the blockchain transaction can also be obtained through query. The query client presents the presentation information to the user so that the user can better understand the service information in the blockchain transaction.

In the method shown in FIG. 4, if the presentation information has been encrypted by an encryption key of the user, the query client decrypts the received presentation information by using a decryption key of the user, and presents the decrypted presentation information to the user.

In addition, data structure parsing logic can be embedded in the query client to parse data encapsulated based on a predetermined data structure. The presentation information is encapsulated based on the data structure. In this case, the query client can parse the received presentation information based on the embedded data structure parsing logic, and present the parsed presentation information to the user.

In addition, the present specification further discloses a blockchain transaction processing method, which is used to improve efficiency of querying a series of related blockchain transactions generated by a service task. It is worthwhile to note that the blockchain transaction processing method disclosed in the present specification is not limited to improving efficiency of querying the blockchain transaction stored in the consortium chain network, and can further improve efficiency of querying a blockchain transaction stored in another type of blockchain network (for example, a public chain network).

Figure 5:
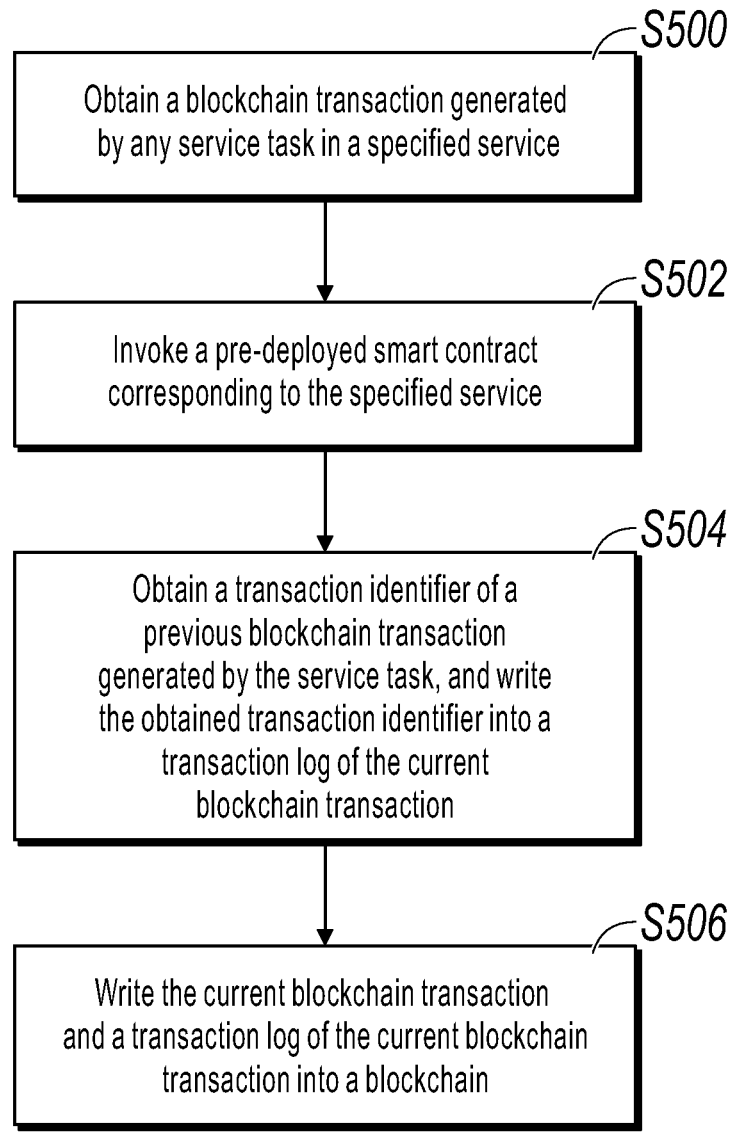
FIG. 5 is a schematic flowchart illustrating a blockchain transaction processing method, according to the present specification.

FIG. 5 is a schematic flowchart illustrating a blockchain transaction processing method, according to the present specification. The method includes the following steps:

S500. Obtain a blockchain transaction generated by any service task in a specified service, and use the blockchain transaction as a current blockchain transaction.

In the present specification, the service task in the specified service means a continuous service task generated in a process of running the specified service. In a process of executing the service task, a series of related blockchain transactions need to be generated and submitted to a blockchain network for storage. For example, in the product tracing service, a service task for product A is generated. A corresponding blockchain transaction needs to be generated for each phase in which product A is delivered from a factory to a customer, and submitted to the blockchain network for storage. A transport process of product A is a service task. A series of blockchain transactions generated by the service task are related to each other. The transport process of product A is jointly recorded.

S502. Invoke a pre-deployed smart contract corresponding to the specified service.

In the implementation of the present specification, the smart contract corresponding to the specified service is deployed in the blockchain network. The smart contract is used to implement a function of writing a transaction identifier of a previous related blockchain transaction into a transaction log of a currently processed blockchain transaction.

After obtaining the blockchain transaction generated by the specified service, each node in the blockchain network needs to invoke the smart contract corresponding to the specified service to process the blockchain transaction.

S504. Obtain, based on the smart contract, a transaction identifier of a previous blockchain transaction generated by the service task, and write the obtained transaction identifier into a transaction log of the current blockchain transaction.

Step S504 provides a process of processing the blockchain transaction by using the smart contract.

In the implementation of the present specification, for any blockchain transaction, the transaction identifier of the blockchain transaction is a hash value obtained by performing hash calculation on the blockchain transaction.

In the implementation of the present specification, the smart contract corresponding to the specified service can maintain an identifier record table corresponding to the service task. In this case, after the obtained transaction identifier is written into the transaction log of the current blockchain transaction, the transaction identifier of the current blockchain transaction can be used as an identifier record and be added to the identifier record table. In addition, obtaining the transaction identifier of the previous blockchain transaction generated by the service task can be reading the transaction identifier from an identifier record recently added to the identifier record table.

In addition, the smart contract corresponding to the specified service can be used to maintain an identifier record corresponding to the service task. In this case, after the obtained transaction identifier is written into the transaction log of the current blockchain transaction, the transaction identifier in the identifier record can be updated to the transaction identifier record of the current blockchain transaction. In addition, obtaining the transaction identifier of the previous blockchain transaction generated by the service task can be reading the transaction identifier from the identifier record.

In the implementation of the present specification, the obtained transaction identifier can be encrypted by using an encryption key related to the service task. The encrypted transaction identifier is written into the transaction log of the current blockchain transaction.

S506. Write the current blockchain transaction and the transaction log of the current blockchain transaction into a blockchain.

When any blockchain transaction generated by the service task is obtained through query, a previous blockchain transaction generated by the service task before the blockchain transaction can be further obtained through query based on the transaction log of the blockchain transaction.

In the method shown in FIG. 5, by using the smart contract deployed in the blockchain network, for each blockchain transaction generated by a service task, a transaction identifier of a previous blockchain transaction generated by the service task before the blockchain transaction is written into the transaction log of the blockchain transaction. Both a blockchain transaction and a corresponding transaction log are written into a blockchain. When the user subsequently requests to query a blockchain transaction generated in the service task, the user can obtain the previous related blockchain transaction of the blockchain transaction through query based on the transaction identifier in the transaction log of the blockchain transaction. As such, the user can obtain all related blockchain transactions before the blockchain transaction currently requested to be queried, instead of traversing the blockchain, thereby improving query efficiency.

Figure 6:
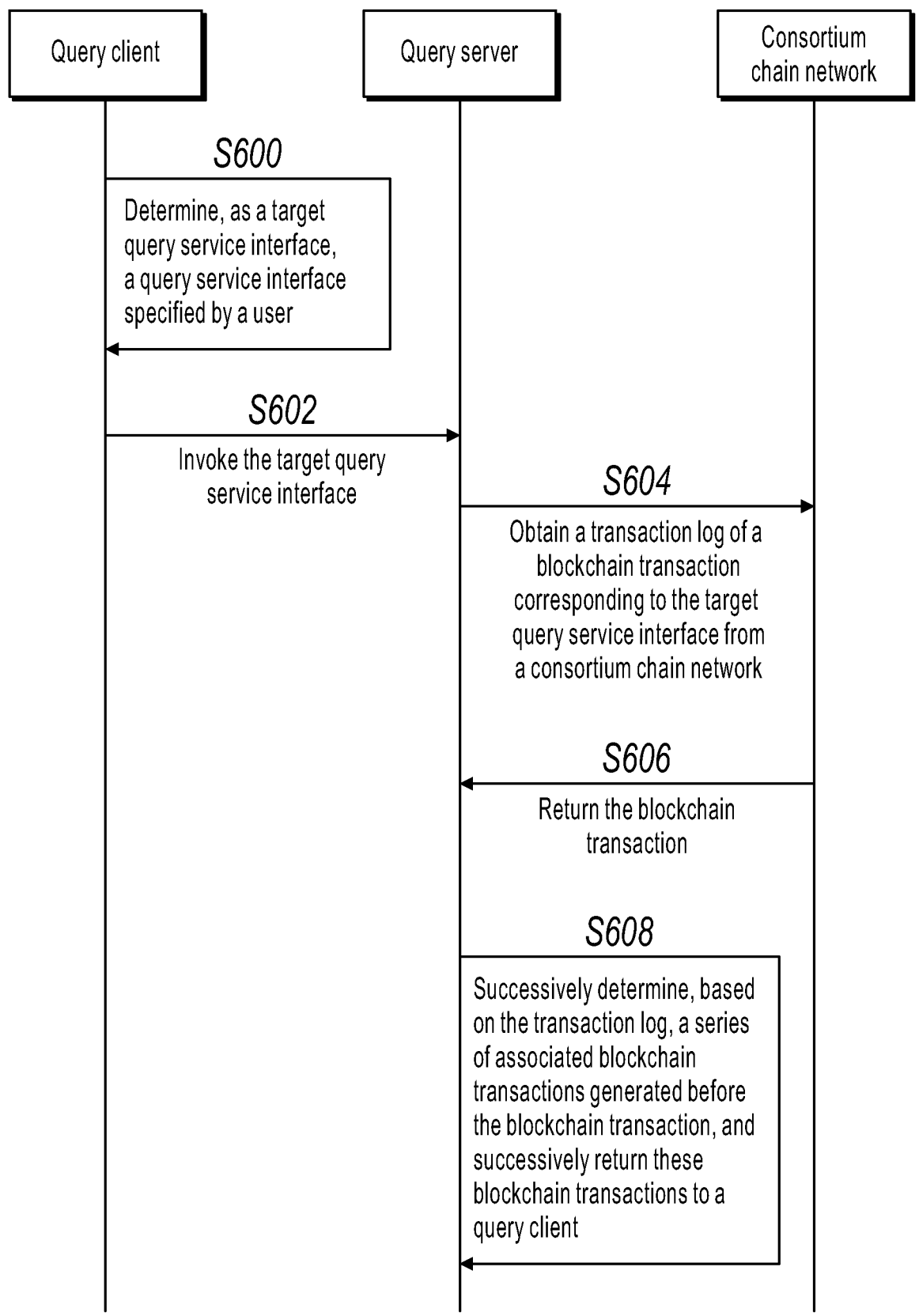
FIG. 6 is a schematic flowchart illustrating a blockchain transaction query method processed in the method shown in FIG. 5, according to an implementation of the present specification.

FIG. 6 is a schematic flowchart illustrating a blockchain transaction query method processed in the method shown in FIG. 5, according to an implementation of the present specification. The method includes the following steps:

S600. A query client determines a query service interface specified by a user as a target query service interface.

S602. The query client invokes the target query service interface of the query server.

S604. When detecting that the target query service interface is invoked, the query server obtains a blockchain transaction corresponding to the target query service interface and a corresponding transaction log from the consortium chain network.

S606. The query server returns, to the query client, a blockchain transaction corresponding to the target query service interface.

S608. Cyclically perform the following steps S6081 to S6084, until a predetermined stop condition is satisfied.

The predetermined stop condition can be that a specified quantity of blockchain transactions has been returned to the query client, or can be that all related blockchain transactions generated before the blockchain transactions corresponding to the target query service interface have been returned to the query client.

S6081. Use a transaction log of the blockchain transaction corresponding to the target query service interface as a target transaction log.

S6082. Extract a transaction identifier from the target transaction log, and obtain, from the consortium chain network, a blockchain transaction corresponding to the extracted transaction identifier and a corresponding transaction log.

S6083. Return the blockchain transaction corresponding to the extracted transaction identifier to the query client.

S6084. Use a transaction log of the blockchain transaction corresponding to the extracted transaction identifier as a target transaction log.

The method shown in FIG. 6 is actually based on the architecture shown in FIG. 1. When the user requests to query a blockchain transaction, all related blockchain transactions generated before the blockchain transaction can be obtained through query. The query client also presents a series of related blockchain transactions to the user to avoid traversing in the blockchain.

In the method shown in FIG. 6, extracting the transaction identifier from the target transaction log can be extracting, from the target transaction log, a transaction identifier encrypted by using an encryption key related to a specified service task. The blockchain transaction corresponding to the target query service interface is generated in the specified service task. Then, the transaction identifier in the target transaction log is decrypted by using the decryption key related to the specified service task.

In addition, it is worthwhile to note that the implementations disclosed in the present specification can be combined. In practice, based on the system architecture shown in FIG. 1, a blockchain browser function can be set in the query client of the user. The user requests to query a blockchain transaction by using the query client. The query server conducts the query instead, returns the blockchain transaction and presentation information in a corresponding transaction log to the user, and returns, to the query client based on a transaction identifier of a previous related blockchain transaction in the transaction log, all related blockchain transactions before the blockchain transactions initially obtained by the user through query (related blockchain transactions are blockchain transactions generated in the same service task) and presentation information in the corresponding transaction log, and presents the related blockchain transactions and the presentation information to the user.

Figure 7:
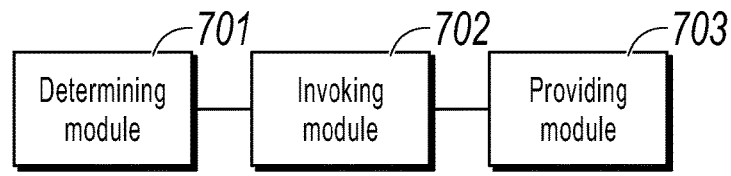
FIG. 7 is a schematic structural diagram illustrating a blockchain transaction query apparatus, according to the present specification.

FIG. 7 is a schematic structural diagram illustrating a blockchain transaction query apparatus, according to the present specification. A query server creates a query service interface corresponding to each blockchain transaction stored in a consortium chain network in advance, and exposes the created query service interface to the apparatus.

The apparatus includes the following: a determining module 701, configured to determine a query service interface specified by a user as a target query service interface; an invoking module 702, configured to invoke the target query service interface of the query server so that the query server obtains a blockchain transaction corresponding to the target query service interface from the consortium chain network, and returns the obtained blockchain transaction to the query client when detecting that the target query service interface is invoked; and a providing module 703, configured to provide the received blockchain transaction for the user.

Figure 8:
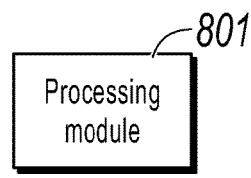
FIG. 8 is a schematic structural diagram illustrating a blockchain transaction query apparatus, according to the present specification.

FIG. 8 is a schematic structural diagram illustrating a blockchain transaction query apparatus, according to the present specification. The apparatus creates in advance a query service interface corresponding to each blockchain transaction stored in a consortium chain network, and exposes the created query service interface to a query client.

The apparatus includes the following: a processing module 801, configured to obtain a blockchain transaction corresponding to the target query service interface from the consortium chain network based on an invoking request, and return the obtained blockchain transaction to the query client so that the query client provides the received blockchain transaction for the user.

The invoking request is an invoking request sent by the query client for the target query service interface, and the target query service interface is a user-specified query service interface determined by the query client.

Figure 9:
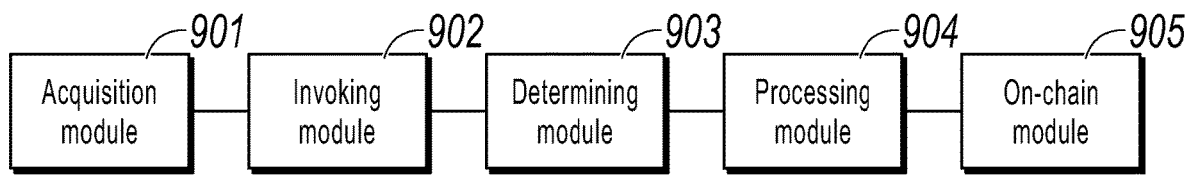
FIG. 9 is a schematic structural diagram illustrating a blockchain transaction processing apparatus, according to the present specification.

FIG. 9 is a schematic structural diagram of a blockchain transaction processing apparatus, according to the present specification. The apparatus is any node in a blockchain network. The apparatus includes the following: an obtaining module 901, configured to obtain a blockchain transaction generated by a specified service, where the blockchain transaction carries service information; an invoking module 902, configured to invoke a pre-deployed smart contract corresponding to the specified service; a determining module 903, configured to determine presentation information based on the smart contract and the service information; a processing module 904, configured to write the determined presentation information into a transaction log of the blockchain transaction based on the smart contract; or write a hash value of the determined presentation information into a transaction log of the blockchain transaction, and store the determined presentation information; and an on-chain module 905, configured to write the blockchain transaction and the transaction log of the blockchain transaction into a blockchain.

When a user requests to query the blockchain transaction, the presentation information in the transaction log is presented to the user.

Figure 10:
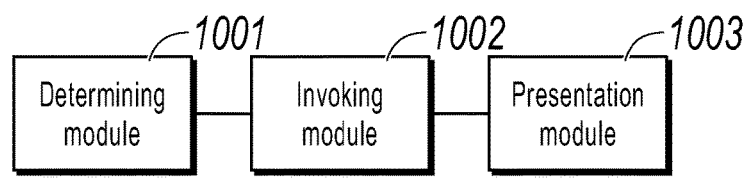
FIG. 10 is a schematic structural diagram illustrating a presentation information query apparatus, according to an implementation of the present specification.

FIG. 10 is a schematic structural diagram illustrating a presentation information query apparatus, according to an implementation of the present specification. A query server creates in advance a query service interface corresponding to each blockchain transaction stored in a consortium chain network, and exposes the created query service interface to the apparatus.

The apparatus includes the following: a determining module 1001, configured to determine a query service interface specified by a user as a target query service interface; an invoking module 1002, configured to invoke the target query service interface of the query server, so that the query server obtains a transaction log of a blockchain transaction corresponding to the target query service interface from the consortium chain network when detecting that the target query service interface is invoked, and the query server extracts presentation information from the transaction log and returns the presentation information to the query client; and a presentation module 1003, configured to present the received presentation information to the user.

Figure 11:
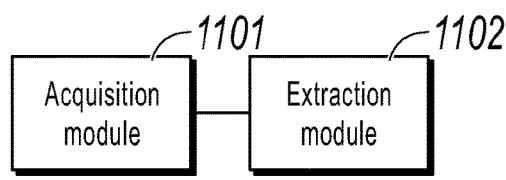
FIG. 11 is a schematic structural diagram illustrating a presentation information query apparatus, according to an implementation of the present specification.

FIG. 11 is a schematic structural diagram illustrating a presentation information query apparatus, according to an implementation of the present specification. The apparatus creates in advance a query service interface corresponding to each blockchain transaction stored in a consortium chain network, and exposes the created query service interface to a query client.

The apparatus includes the following: an acquisition module 1101, configured to: when detecting that the target query service interface is invoked, obtain a transaction log of a blockchain transaction corresponding to the target query service interface from the consortium chain network, where the target query service interface is a query service interface specified by the user to the query client; and an extraction module 1102, configured to extract presentation information from the transaction log and return the presentation information to the query client, so that the query client presents the received presentation information to the user.

Figure 12:
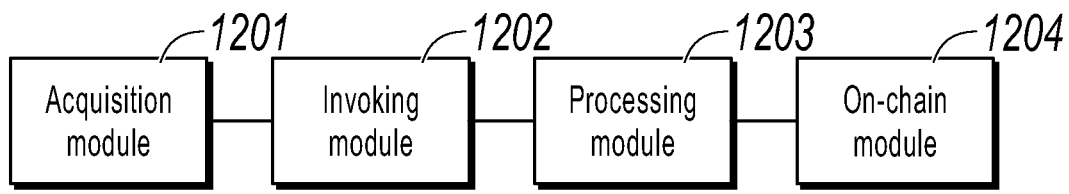
FIG. 12 is a schematic structural diagram illustrating a blockchain transaction processing apparatus, according to an implementation of the present specification.

FIG. 12 is a schematic structural diagram of a blockchain transaction processing apparatus, according to an implementation of the present specification. The apparatus is any node in a blockchain network. The apparatus includes the following: an acquisition module 1201, configured to obtain a blockchain transaction generated by any service task in a specified service, and use the blockchain transaction as a current blockchain transaction; an invoking module 1202, configured to invoke a pre-deployed smart contract corresponding to the specified service; a processing module 1203, configured to obtain, based on the smart contract, a transaction identifier of a previous blockchain transaction generated by the service task, and write the obtained transaction identifier into a transaction log of the current blockchain transaction; and an on-chain module 1204, configured to write the blockchain transaction and the transaction log of the current blockchain transaction into a blockchain.

When any blockchain transaction generated by the service task is obtained through query, a blockchain transaction generated by the service task before the blockchain transaction can be further obtained through query based on the transaction log of the blockchain transaction.

Figure 13:
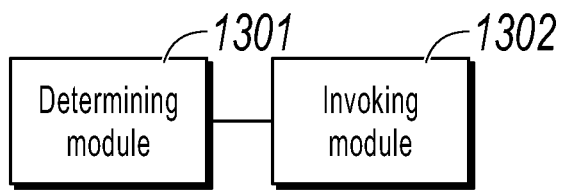
FIG. 13 is a schematic structural diagram illustrating a blockchain transaction query apparatus, according to an implementation of the present specification.

FIG. 13 is a schematic structural diagram illustrating a blockchain transaction query apparatus, according to an implementation of the present specification. A query server creates in advance a query service interface corresponding to each blockchain transaction stored in a consortium chain network, and exposes the created query service interface to the apparatus.

The apparatus includes the following: a determining module 1301, configured to determine a query service interface specified by a user as a target query service interface; and an invoking module 1302, configured to invoke the target query service interface of the query server, so that the query server obtains a blockchain transaction corresponding to the target query service interface and a corresponding transaction log when detecting that the target query service interface is invoked, and the query server returns the blockchain transaction corresponding to the target query service interface to the query client, and performs the following steps circularly until a predetermined stop condition is satisfied: using the transaction log of the blockchain transaction corresponding to the target query service interface as a target transaction log; extracting a transaction identifier from the target transaction log, and obtaining a blockchain transaction corresponding to the extracted transaction identifier and a corresponding transaction log from the consortium chain network; returning the blockchain transaction corresponding to the extracted transaction identifier to the query client; and using the transaction log of the blockchain transaction corresponding to the extracted transaction identifier as a target transaction log.

Figure 14:
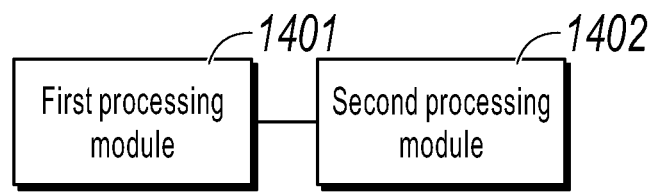
FIG. 14 is a schematic structural diagram illustrating a blockchain transaction query apparatus, according to an implementation of the present specification.

FIG. 14 is a schematic structural diagram illustrating a blockchain transaction query apparatus, according to an implementation of the present specification. The apparatus creates in advance a query service interface corresponding to each blockchain transaction stored in a consortium chain network, and exposes the created query service interface to a query client.

The apparatus includes the following: a first processing module 1401, configured to: when detecting that a target query service interface is invoked, obtain a blockchain transaction corresponding to the target query service interface from the consortium chain network and a corresponding transaction log, where the target query service interface is a query service interface specified by a user to the query client; and a second processing module 1402, configured to return the blockchain transaction corresponding to the target query service interface to the query client and perform the following steps circularly until a predetermined stop condition is satisfied: using a transaction log of a blockchain transaction corresponding to the target query service interface as a target transaction log; extracting a transaction identifier from the target transaction log, and obtaining the blockchain transaction corresponding to the extracted transaction identifier and a corresponding transaction log from the consortium chain network; returning the blockchain transaction corresponding to the extracted transaction identifier to the query client; and using the transaction log of the blockchain transaction corresponding to the extracted transaction identifier as a target transaction log.

An implementation of the present specification further provides a computer device. The computer device includes at least a memory, a processor, and a computer program that is stored in the memory and that can run on the processor. When the processor executes the program, functions of the method disclosed in the present specification are implemented.

Figure 15:
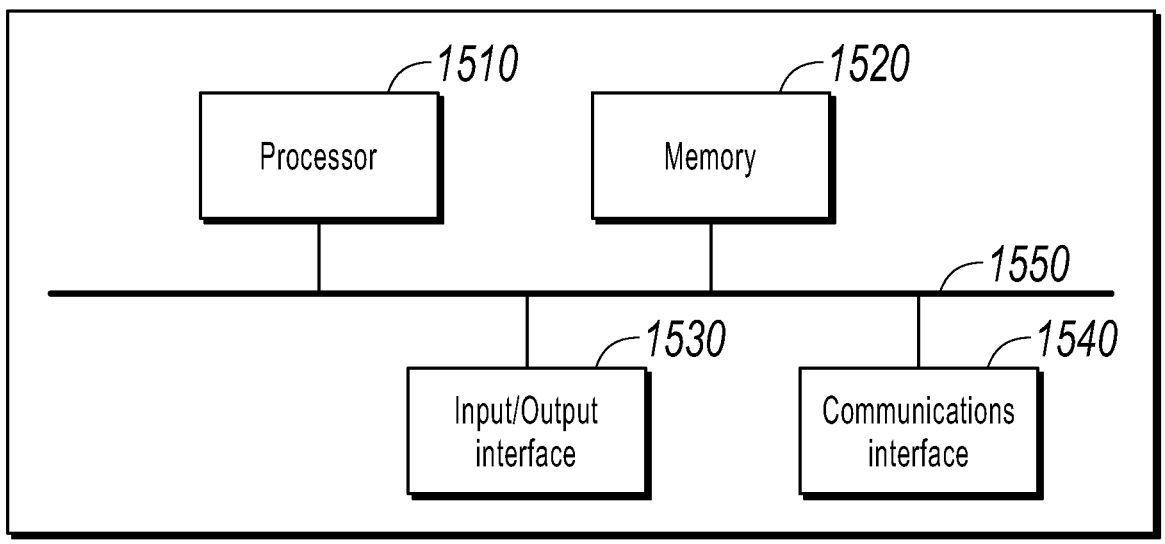
FIG. 15 is a schematic structural diagram illustrating a computer device for configuring the apparatus, according to an implementation of the present specification.

FIG. 15 is a more detailed schematic diagram illustrating a hardware structure of a computing device, according to an implementation of the present specification. The device can include a processor 1510, a memory 1520, an input/output interface 1530, a communications interface 1540, and a bus 1550. The processor 1510, the memory 1520, the input/output interface 1530, and the communications interface 1540 are communicatively connected to each other in the device by using the bus 1550.

The processor 1510 can be implemented by using a general central processing unit (CPU), a microprocessor, an application-specific integrated circuit (ASIC), one or more integrated circuits, etc., and is configured to execute a related program to implement the technical solutions provided in the implementations of the present specification.

The memory 1520 can be implemented by using a read-only memory (ROM), a random access memory (RAM), a static storage device, a dynamic storage device, etc. The memory 1520 can store an operating system and another application program. When the technical solutions provided in the implementations of the present specification are implemented by using software or firmware, related program code is stored in the memory 1520, and is invoked and executed by the processor 1510.

The input/output interface 1530 is configured to be connected to an input/output module to input/output information. The input/output module (not shown in the figure) can be used as a component and configured in the device, or can be externally connected to the device to provide a corresponding function. The input module can include a keyboard, a mouse, a touchscreen, a microphone, various sensors, etc. The output module can include a display, a speaker, an oscillator, an indicator, etc.

The communications interface 1540 is configured to be connected to a communications module (not shown in the figure), to implement a communication interaction between the device and another device. The communications module can implement communication in a wired method (for example, USB or a network cable), or can implement communication in a wireless method (for example, a mobile network, Wi-Fi, or Bluetooth).

The bus 1550 includes a channel used to transmit information between components (for example, the processor 1510, the memory 1520, the input/output interface 1530, and the communications interface 1540) of the device.

It is worthwhile to note that although only the processor 1510, the memory 1520, the input/output interface 1530, the communications interface 1540, and the bus 1550 of the device are shown, during specific implementation, the device can further include other components required for implementing normal running. In addition, a person skilled in the art can understand that the device can include only components necessary for implementing the solutions in the implementations of the present specification, but does not necessarily include all components shown in the figure.

An implementation of the present application further provides a computer readable storage medium. The computer readable storage medium stores a computer program. When a processor executes the program, functions of the method disclosed in the present specification are implemented.

The computer readable medium includes persistent, non-persistent, movable, and unmovable media that can store information by using any method or technology. The information can be a computer readable instruction, a data structure, a program module, or other data. Examples of the computer storage medium include but are not limited to a phase change RAM (PRAM), a static RAM (SRAM), a dynamic RAM (DRAM), a RAM of another type, a ROM, an electrically erasable programmable ROM (EEPROM), a flash memory or another memory technology, a compact disc ROM (CD-ROM), a digital versatile disc (DVD) or another optical storage, a cassette, a cassette magnetic disk storage or another magnetic storage device, or any other non-transmission medium. The computer storage medium can be configured to store information that can be accessed by a computing device. As described in the present specification, the computer readable medium does not include computer readable transitory media such as a modulated data signal and a carrier.

It can be seen from the previous descriptions of the implementations that, a person skilled in the art can clearly understand that the implementations of the present specification can be implemented by using software and a necessary general hardware platform. Based on such an understanding, the technical solutions in the implementations of the present specification essentially or the part contributing to the existing technology can be implemented in a form of a software product. The computer software product can be stored in a storage medium, such as a ROM/RAM, a magnetic disk, or an optical disc, and includes several instructions for instructing a computer device (which can be a personal computer, a server, a network device, etc.) to perform the method described in the implementations of the present specification or in some parts of the implementations of the present specification.

The system, method, module, or unit illustrated in the previous implementations can be implemented by using a computer chip or an entity, or can be implemented by using a product having a certain function. A typical implementation device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

The implementations in the present specification are described in a progressive way. For same or similar parts of the implementations, references can be made to the implementations. Each implementation focuses on a difference from other implementations. Particularly, an apparatus implementation is similar to a method implementation, and therefore is described briefly. For a related part, references can be made to some descriptions in the method implementation. The previously described apparatus implementations are merely examples. The modules described as separate parts may or may not be physically separate. During implementation of the solutions in the implementations of the present specification, functions of the modules can be implemented in one or more pieces of software and/or hardware. Some or all of the modules can be selected based on an actual need to implement the solutions of the implementations. A person of ordinary skill in the art can understand and implement the implementations of the present specification without creative efforts.

The previous descriptions are merely specific implementations of the present specification. It is worthwhile to note that a person of ordinary skill in the art can further make several improvements or polishing without departing from the principle of the implementations of the present specification, and the improvements or polishing shall fall within the protection scope of the implementations of the present specification.

What is claimed is:

1. A computer-implemented method for blockchain transaction processing, comprising:
   obtaining, by a blockchain node of a consortium blockchain network, a blockchain transaction associated with a service, the blockchain transaction comprising service information represented in a first form;
   invoking, by the blockchain node, a smart contract corresponding to the service, wherein the smart contract comprises a function of determining presentation information of the service information, the presentation information is of a more user friendly form than the first form of the service information when presented to a user through a client device;
   determining, by the blockchain node, the presentation information by invoking the function of the smart contract corresponding to the service, wherein determining the presentation information of the service information comprises converting the service information from the first form into the more user friendly form for the user to understand;
   recording, by the blockchain node, the presentation information into a blockchain transaction log based on the smart contract;
   recording, by the blockchain node, the blockchain transaction and the blockchain transaction log of the blockchain transaction into a blockchain; and
   in response to a query from the client device requesting the blockchain transaction, transmitting, by the blockchain node, the presentation information included in the blockchain transaction log to the client device to be presented by the client device.

2. The computer-implemented method of claim 1, wherein the presentation information is encrypted by an encryption key provided by an initiator of the blockchain transaction before recording into the blockchain transaction log.

3. The computer-implemented method of claim 1, wherein the smart contract comprises a data structure agreed to by the user.

4. The computer-implemented method of claim 3, wherein the presentation information is encapsulated based on the data structure before recording into the blockchain transaction log.

5. The computer-implemented method of claim 1, wherein the presentation information is presented to the user by retrieving from the blockchain transaction log, and wherein the blockchain transaction log is obtained from the consortium blockchain network by a server, in response to detecting that a blockchain transaction query interface is invoked by receiving the query from the client device.

6. The computer-implemented method of claim 5, wherein the presentation information is encrypted by an encryption key of the user, and is decrypted by the client device before presenting to the user.

7. The computer-implemented method of claim 5, wherein the presentation information is encapsulated based on a data structure, and is decapsulated by the client device before presenting to the user.

8. The computer-implemented method of claim 1, wherein the service information comprises a segment of abstract code, and the presentation information comprises a human-readable text corresponding to the segment of abstract code.

9. The computer-implemented method of claim 1, wherein the first form comprises a text form, and the more user friendly form comprises one or more of an audio form or a video form.

10. A computer-implemented system for blockchain transaction processing, comprising:
one or more processors; and
one or more computer-readable memories coupled to the one or more processors and having instructions stored thereon that are executable by the one or more processors to perform one or more operations, comprising:
obtaining, by a blockchain node of a consortium blockchain network, a blockchain transaction associated with a service, the blockchain transaction comprising service information represented in a first form;
invoking, by the blockchain node, a smart contract corresponding to the service, wherein the smart contract comprises a function of determining presentation information of the service information, the presentation information is of a more user friendly form than the first form of the service information when presented to a user through a client device;
determining, by the blockchain node, the presentation information by invoking the function of the smart contract corresponding to the service, wherein determining the presentation information of the service information comprises converting the service information from the first form into the more user friendly form for the user to understand;
recording, by the blockchain node, the presentation information into a blockchain transaction log based on the smart contract;
recording, by the blockchain node, the blockchain transaction and the blockchain transaction log of the blockchain transaction into a blockchain; and
in response to a query from the client device requesting the blockchain transaction, transmitting, by the blockchain node, the presentation information included in the blockchain transaction log to the client device to be presented by the client device.

11. The computer-implemented system of claim 10, wherein the presentation information is encrypted by an encryption key provided by an initiator of the blockchain transaction before recording into the blockchain transaction log.

12. The computer-implemented system of claim 10, wherein the smart contract comprises a data structure agreed to by the user.

13. The computer-implemented system of claim 12, wherein the presentation information is encapsulated based on the data structure before recording into the blockchain transaction log.

14. The computer-implemented system of claim 10, wherein the presentation information is presented to the user by retrieving from the blockchain transaction log, and wherein the blockchain transaction log is obtained from the consortium blockchain network by a server, in response to detecting that a blockchain transaction query interface is invoked by receiving the query from the client device.

15. The computer-implemented system of claim 14, wherein the presentation information is encrypted by an encryption key of the user, and is decrypted by the client device before presenting to the user.

16. The computer-implemented system of claim 14, wherein the presentation information is encapsulated based on a data structure, and is decapsulated by the client device before presenting to the user.

17. A non-transitory, computer-readable medium storing one or more instructions executable by a computer-implemented authentication system to perform one or more operations for blockchain transaction processing, comprising:
obtaining, by a blockchain node of a consortium blockchain network, a blockchain transaction associated with a service, the blockchain transaction comprising service information represented in a first form;
invoking, by the blockchain node, a smart contract corresponding to the service, wherein the smart contract comprises a function of determining presentation information of the service information, the presentation information is of a more user friendly form than the first form of the service information when presented to a user through a client device;
determining, by the blockchain node, the presentation information by invoking the function of the smart contract corresponding to the service, wherein determining the presentation information of the service information comprises converting the service information from the first form into the more user friendly form for the user to understand;
recording, by the blockchain node, the presentation information into a blockchain transaction log based on the smart contract;
recording, by the blockchain node, the blockchain transaction and the blockchain transaction log of the blockchain transaction into a blockchain; and
in response to a query from the client device requesting the blockchain transaction, transmitting, by the blockchain node, the presentation information included in the blockchain transaction log to the client device to be presented by the client device.

18. The non-transitory, computer-readable medium of claim 17, wherein the presentation information is encrypted by an encryption key provided by an initiator of the blockchain transaction before recording into the blockchain transaction log.

19. The non-transitory, computer-readable medium of claim 17, wherein the smart contract comprises a data structure agreed to by the user.

20. The non-transitory, computer-readable medium of claim 19, wherein the presentation information is encapsulated based on the data structure before recording into the blockchain transaction log.

21. The non-transitory, computer-readable medium of claim 17, wherein the presentation information is presented to the user by retrieving from the blockchain transaction log, and wherein the blockchain transaction log is obtained from the consortium blockchain network by a server, in response to detecting that a blockchain transaction query interface is invoked by receiving the query from the client device.

22. The non-transitory, computer-readable medium of claim 21, wherein the presentation information is encrypted by an encryption key of the user, and is decrypted by the client device before presenting to the user.

23. The non-transitory, computer-readable medium of claim 21, wherein the presentation information is encapsulated based on a data structure, and is decapsulated by the client device before presenting to the user.

* * * * *